United States Patent [19]

Yanai et al.

[11] Patent Number: 5,069,963

[45] Date of Patent: Dec. 3, 1991

[54] MAGNETIC RECORDING MEDIUM WITH A BACK COAT LAYER OF NITROCELLULOSE AND POLYURETHANE BINDER RESINS AND WHICH CONTAINS CARBON BLACK AND TITANIUM DIOXIDE PARTICLES

[75] Inventors: Hidetoshi Yanai; Akira Ishikawa, both of Tochigi, Japan

[73] Assignee: KAO Corporation, Tokyo, Japan

[21] Appl. No.: 575,014

[22] Filed: Aug. 30, 1990

[30] Foreign Application Priority Data

Sep. 4, 1989 [JP] Japan ................................. 1-229077

[51] Int. Cl.$^5$ .............................................. G11B 23/00
[52] U.S. Cl. .................................... 428/323; 428/402; 428/425.1; 428/694; 428/900
[58] Field of Search ..................... 428/900, 694, 425.1, 428/425.9, 402, 338, 323

[56] References Cited

U.S. PATENT DOCUMENTS 4,612,244  9/1986  Kaneda et al. ...................... 428/323
4,619,868 10/1986  Okita et al. ........................ 428/425.1

*Primary Examiner*—Merrell C. Cashion, Jr.
*Assistant Examiner*—Stevan A. Resan
*Attorney, Agent, or Firm*—Nixon & Vanderhye

[57] ABSTRACT

A magnetic recording medium for use in a belt-driven cartridge is disclosed, which comprises a non-magnetic support provided a magnetic layer on the principal surface thereof and a back coat layer on the opposite surface thereof, wherein a back coat layer containing (a) a carbon black having a mean grain diameter of 20 to 100 nm; (b) a titanium oxide having a mean grain diameter of 100 to 600 nm; and (c) a binder consisting essentially of a pyroxylin and a polyurethane resin, provided that the weight proportion of component (a) to component (b) is in the range of 99:1 to 60:40, the weight proportion of the sum of component (a) and component (b) to component (c) is in the range of 70:30 to 20:80, and the weight proportion of the pyroxylin to the polyurethane resin in said component (c) is in the range of 10:90 to 90:10.

4 Claims, No Drawings

MAGNETIC RECORDING MEDIUM WITH A BACK COAT LAYER OF NITROCELLULOSE AND POLYURETHANE BINDER RESINS AND WHICH CONTAINS CARBON BLACK AND TITANIUM DIOXIDE PARTICLES

FIELD OF THE INVENTION

The present invention relates to a magnetic recording medium. More particularly, the present invention relates to a magnetic recording medium which is adapted to be used in a belt-driven cartridge.

BACKGROUND OF THE INVENTION

Magnetic tapes adapted for use in a belt-driven cartridge normally have a back coat layer on the surface of a support opposite a magnetic layer for recording data.

However, when these magnetic tapes are running in a belt-driven cartridge, the back coat layer is subject to harsh abrasion under pressure by the belt.

In order to eliminate such a difficulty, various approaches have been proposed. In one of these approaches, large grain diameter carbon is employed. In another approach, an inorganic powder with a high Mohs hardness of 7 or more is blended in the system as an abrasive grain. However, the use of large grain diameter carbon cannot provide a sufficient effect in view of running durability since the back coat layer is liable to be injured during running for a long time of period. The use of an inorganic powder with a high Mohs hardness causes difficulties, i.e., the abrasion of the guide pin. Thus, the existing magnetic recording media do not provide acceptable running durability of the back coat layer.

SUMMARY OF THE INVENTION

It is an object of the present invention to provide a magnetic recording medium which is not susceptible to abrasion of the back coat layer.

The above and other objects of the present invention will become more apparent from the following detailed description and examples.

The inventors found that the running durability of the back coat layer can be improved by making the back coat layer of a mixture of a carbon black and a titanium oxide with a specified grain diameter in a specified proportion and using a binder consisting of a pyroxylin and a polyurethane resin also in a specified proportion.

These objects of the present invention are accomplished with a magnetic recording medium having a magnetic layer on the principal surface of a non-magnetic support and a back coat layer on the opposite surface and adapted to be used in a belt-driven cartridge. The back coat layer comprises:

(a) a carbon black having a mean grain diameter of 20 to 100 nm;

(b) a titanium oxide having a mean grain diameter of 100 to 600 nm; and (c) a binder consisting essentially of a pyroxylin and a polyurethane resin, with the proviso that the weight proportion of component (a) to component (b) is in the range of 99:1 to 60:40, that the weight proportion of the sum of component (a) and component (b) to component (c) is in the range of 70:30 to 20:80, and that the weight proportion of the pyroxylin to the polyurethane resin in component (c) is in the range of 10:90 to 90:10.

DETAILED DESCRIPTION OF THE INVENTION

The carbon back (a) and the titanium oxide (b), which can be used in the present invention can be respectively ones customarily used in the ordinary magnetic recording media. Among these titanium oxides, titanium dioxide ($TiO_2$) is preferred.

The mean grain diameter of the carbon black (a) to be used in the present invention is in the range of 20 to 100 nm, preferably 30 to 55 nm. The mean grain diameter of the titanium oxide (b) to be used in the present invention is in the range of 100 to 600 nm, preferably 200 to 400 nm.

The weight proportion of component (a) to the component (b) is in the range of 99:1 to 60:40, preferably 95:5 to 80:20. If the proportion of the titanium oxide (b) falls below this range, the back coat layer is more subject to abrasion. On the contrary, if the proportion of the titanium oxide (b) exceeds this range, the guide pin is more subject to abrasion.

The binder (c) to be used in the present invention contains at least a pyroxylin and a polyurethane resin. The weight proportion of the pyroxylin to the polyurethane resin is in the range of 10:90 to 90:10, preferably 40:60 to 80:20. If the amount of the polyurethane resin exceeds this range, it makes the back coat layer too flexible. On the contrary, if the amount of the polyurethane resin falls below this range, it lowers the adhesion of the back coat layer.

The pyroxylin included in component (c) can preferably be industrial nitrocellulose. Examples of such an industrial nitrocellulose include Cellnova HIG ½, Cellnova HIG ⅛, Cellnova HIG 1/16, Cellnova BTH 1, and Cellnova BTH 1 (trade names, each manufactured by Asahi Kasei Kogyo K.K.).

The polyurethane resin included in component (c) can be one customarily used in ordinary magnetic recording media.

In the present invention, components (a), (b) and (c) are used in amounts such that the weight proportion of the sum of component (a) and component (b) to component (c) is in the range of 70:30 to 20:80, preferably 50:50 to 30:70. If the mixing proportion of the binder (c) exceeds this range, the back coat layer is more subject to abrasion. If the mixing proportion of the binder (c) falls below this range, powders such as the carbon black easily separate from the back coat layer.

The magnetic layer or the back coat layer of the magnetic recording medium of the present invention may also contain multifunctional isocyanates, lubricants, dispersants or the like in combination with the above mentioned components as well as other components customarily used in the ordinary recording media.

The magnetic recording medium of the present invention can be prepared by providing the magnetic layer onto the principal surface of the non-magnetic support and the back coat layer onto the opposite surface of the support in the manner commonly used in the art.

The thickness of the back coat layer is preferably around 1 $\mu$m.

The present invention will be further described in the following examples, but the present invention should not be construed as being so limited. Unless otherwise indicated, all parts and percentages are by weight.

EXAMPLES 1 to 4 and COMPARATIVE EXAMPLES 1 to 4

Preparation of magnetic layer

A coating blend having the following composition was mixed in a basket mill (produced by Asada Tekko K. K.) for 6 hours. 4 parts by weight of Coronate L (trade name, a trimethylol propane triisocyanate, produced by Nippon Polyurethane Industry Co., Ltd.) was added to the blend. The mixture was then stirred for 15 minutes, and filtered to obtain a magnetic coating. The coating was coated on a 10.5-μm thick PET film so as to give a dried film thickness of 1.5 μm. The coated film was then magnetically oriented under 1,500 G, and dried to form a magnetic layer on the PET film. The coated film was then wound on a roll. The magnetic layer was then calendared at a temperature of 80° C.

| Composition of coating blend for magnetic layer: | |
| --- | --- |
| Co-covered γ-Fe$_2$O$_3$ ($Hc$ = 550 Oe) | 100 parts |
| Gafac RE610*[1] | 2 parts |
| Carbon black (mean grain diameter: 25 nm) | 6 parts |
| α-Al$_2$O$_3$ (mean grain diameter: 0.3 μm) | 2 parts |
| VAGH*[2] | 14 parts |
| Nippolan 2304*[3] | 10 parts |
| Tridecyl stearate | 3 parts |
| Methyl ethyl ketone | 120 parts |
| Toluene | 50 parts |
| Cyclohexanone | 50 parts |

Notes:
*[1] trade name, a phosphoric dispersant, produced by Toho Kagaku K.K.
*[2] trade name, a vinyl chloride/vinyl acetate/polyvinyl alcohol copolymer, produced by Union Carbide Co.
*[3] trade name, a polyurethane resin, produced by Nippon Polyurethane Industry Co., Ltd.

Preparation of back coat layer

Each back coating blend having the composition as set forth in Table 1 was stirred in a ball mill for 96 hours. 20 parts by weight of Coronate L was added to each mixture. Each mixture was then stirred for 30 minutes to prepare a back coating solution. Each coating solution thus obtained was then coated on the other side of the PET film on which the magnetic layer had been formed so as to give a dried film thickness of 1.5 μm. Each coated material was then dried to form a back coat layer on the PET film.

Each PET film comprising the magnetic layer and the back coat layer was slit into a tape with a width of ¼ inch and then mounted in a cartridge conforming with the belt-driven computer tapes standard QIC-120 to obtain cartridges for evaluation.

Evaluation

After running 1,500 passes driven in accordance with standard QIC-120, each cartridge thus prepared was then evaluated for abrasion of the back coat layer and scraping of guide pin in accordance with the following criteria:

(1) Abrasion of back coat layer

After running, the back coat layer was observed at a magnification of 100x under a reflective optical microscope for abrasion or scratches at the portion in contact with the belt. The evaluation was made in 5 stages.

| | Criterion: |
| --- | --- |
| 5: | No abrasion and no scratch. |
| 2 to 4: | Equally dividing the interval between 5 and 1. |
| 1: | Harsh abrasion or scratch. |

Scraping of guide pin

Before and after running, the guide pin was observed at a magnification of 40x under a stereomicroscope for scraping. The evaluation was made in 5 stages.

| | Criterion: |
| --- | --- |
| 5: | No abrasion and no scratch. |
| 2 to 4: | Equally dividing the interval between 5 and 1. |
| 1: | Harsh abrasion or scratch. |

In both the evaluations (1) and (2), levels of the stage of 3 or higher are acceptable and practically useful.

The results are set forth in Table 1. Table 1 shows that the products of the present invention exhibit improvements in the abrasion resistance of the back coat layer and guide pin.

In the comparative examples, Comparative Example 1 contained no titanium dioxide. In Comparative Example 2 no polyurethane resin was present. In Comparative Example 3, the weight proportion of the carbon black and the titanium dioxide does not fall within the range of the present invention while in Comparative Example 4, the weight proportion of the pyroxylin and the polyurethane does not fall within the range of the present invention.

TABLE 1

| Component in the Back coat layer | Example | | | | Comparative Example | | | |
| --- | --- | --- | --- | --- | --- | --- | --- | --- |
| | 1 | 2 | 3 | 4 | 1 | 2 | 3 | 4 |
| Carbon black: | | | | | | | | |
| Mean grain diamter: 35 nm | 475 | 440 | — | — | 500 | 475 | — | — |
| Mean grain diameter: 42 nm | — | — | 360 | 270 | — | — | 250 | 135 |
| Titanium dioxide (mean grain diameter: 0.2 to 0.4 nm) | 25 | 60 | 40 | 30 | — | 25 | 250 | 15 |
| Pyroxylin: | | | | | | | | |
| Cellnova HIG ½ | 250 | 350 | 240 | — | 250 | 500 | — | — |
| Cellnova HIG ⅛ | — | — | — | 280 | — | — | 250 | 600 |
| Polyurethane: | | | | | | | | |
| Nippolan 2304*[1] | 250 | 150 | — | — | 250 | — | — | 250 |
| Nippolan 5033*[2] | — | — | 360 | 420 | — | — | 250 | — |
| Solvent: | | | | | | | | |
| Methyl ethyl ketone | 3000 | 3000 | 2000 | 2500 | 2000 | 2500 | 3000 | 2500 |
| Toluene | 1000 | 1000 | 2000 | 1500 | 2000 | 1500 | 1000 | 1500 |

TABLE 1-continued

| Component in the Back | Example | | | | Comparative Example | | | |
|---|---|---|---|---|---|---|---|---|
| coat layer | 1 | 2 | 3 | 4 | 1 | 2 | 3 | 4 |
| Evaluation | | | | | | | | |
| Back coat layer | 5 | 5 | 5 | 5 | 2 | 2 | 2 | 1 |
| Guide pin | 5 | 5 | 5 | 5 | 2 | 3 | 1 | 4 |

Notes: *1 and *2: trade name, an urethane resin produced by Nippon Polyurethane Industries Co., Ltd.

While the invention has been described in detail and with reference to specific embodiments thereof, it will be apparent to one skilled in the art that various changes and modifications can be made therein without departing from the spirit and scope thereof.

What is claimed:

1. A magnetic recording medium for use in a belt-driven cartridge, which comprises a non-magnetic support provided a magnetic layer on the principal surface thereof and a back coat layer on the opposite surface thereof, wherein said back coat layer comprises:
   (a) a carbon black having a mean grain diameter of 20 to 100 nm;
   (b) a titanium oxide having a mean grain diameter of 100 to 600 nm; and
   (c) a binder consisting essentially of a pyroxylin and a polyurethane resin, with the proviso that the weight proportion of component (a) to component (b) is in the range of 99:1 to 60:40, that the weight proportion of the sum of component (a) and component (b) to component (c) is in the range of 50:50 to 30:70, and that the weight proportion of pyroxylin to polyurethane resin in component (c) is in the range of 10:90 to 90:10.

2. A magnetic recording medium as claimed in claim 1, wherein the mean grain diameter of the carbon black is in the range of 30 to 55 nm.

3. A magnetic recording medium as claimed in claim 1, wherein the weight proportion of component (a) to component (b) is in the range of 95:5 to 80:20.

4. A magnetic recording medium as claimed in claim 1, wherein the weight proportion of the pyroxylin to the polyurethane resin in component (c) is in the range of 40:60 to 80:20.

* * * * *